Nov. 18, 1958 F. T. KAISER 2,860,791
CUPOLA CHARGING APPARATUS UTILIZING A CONE BOTTOM BUCKET
Filed Jan. 13, 1955 2 Sheets-Sheet 1
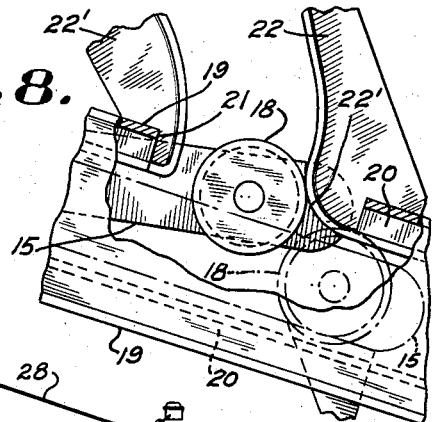
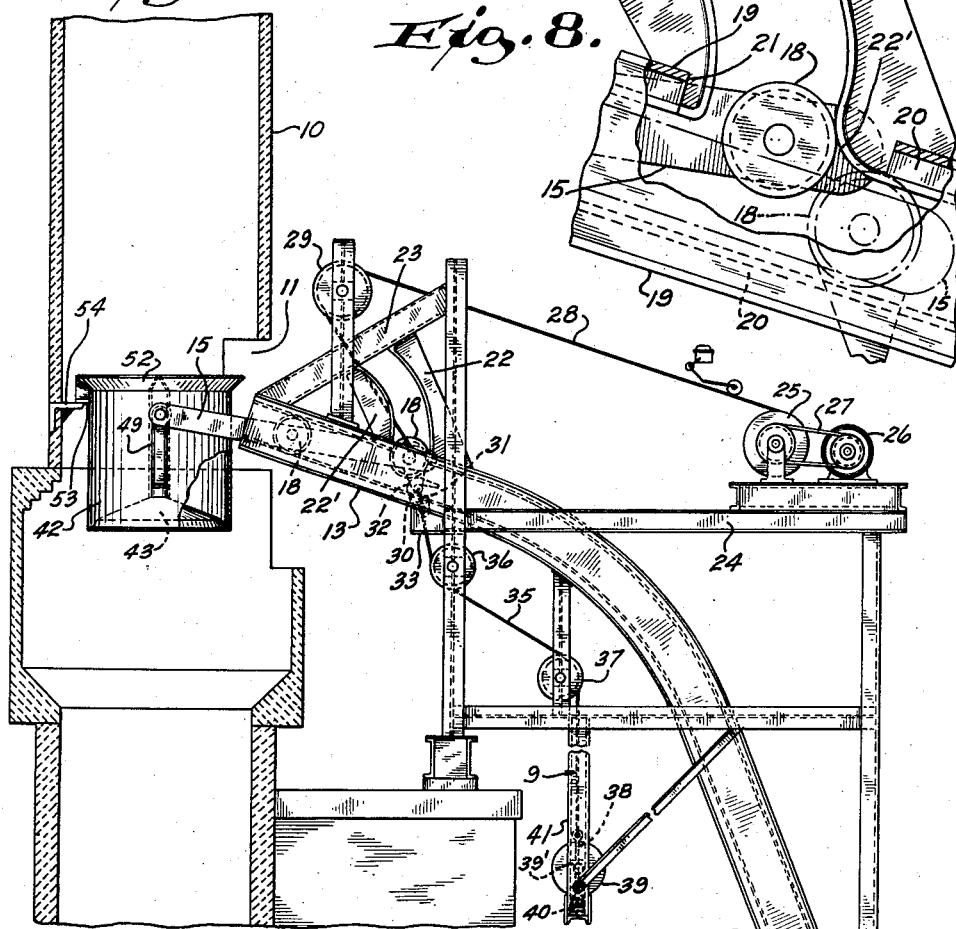
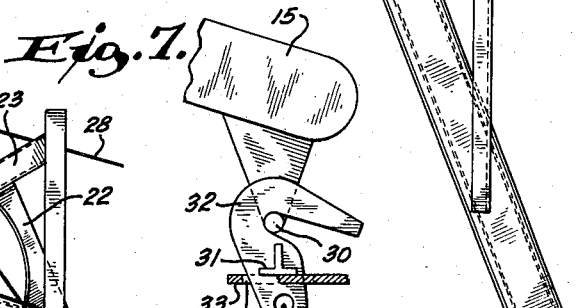
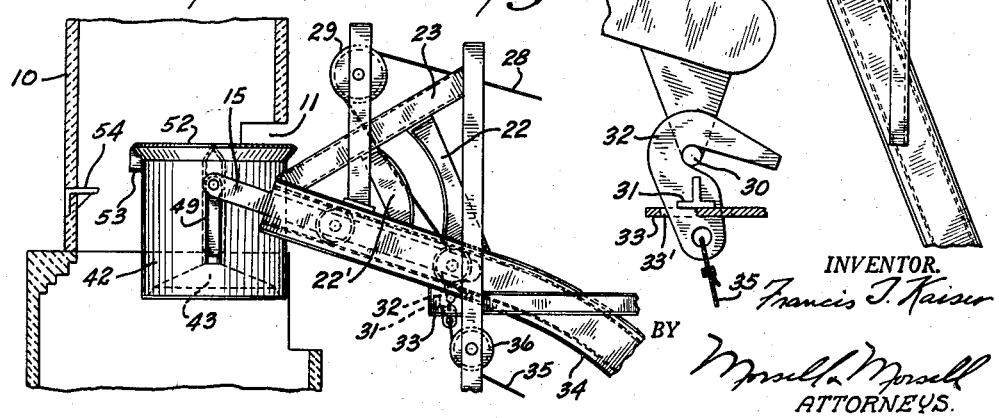
INVENTOR.
Francis T. Kaiser
BY
Morsell & Morsell
ATTORNEYS.

Nov. 18, 1958 F. T. KAISER 2,860,791
CUPOLA CHARGING APPARATUS UTILIZING A CONE BOTTOM BUCKET
Filed Jan. 13, 1955 2 Sheets-Sheet 2
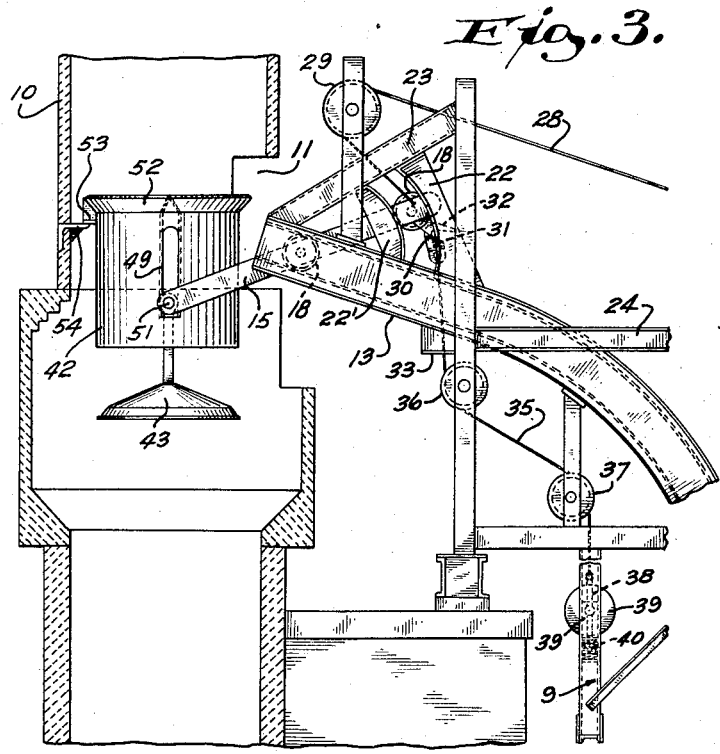
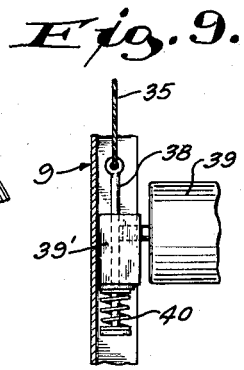
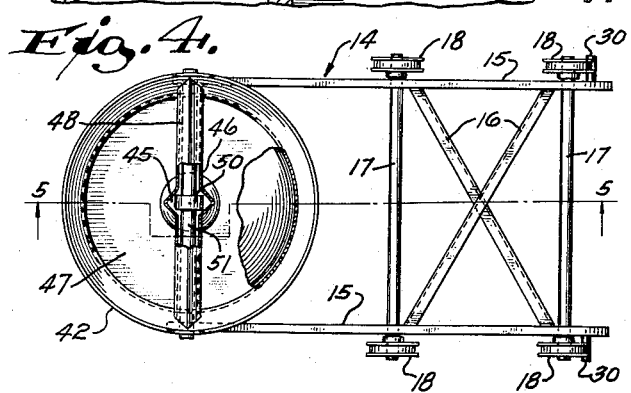
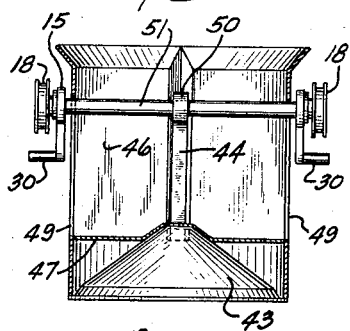
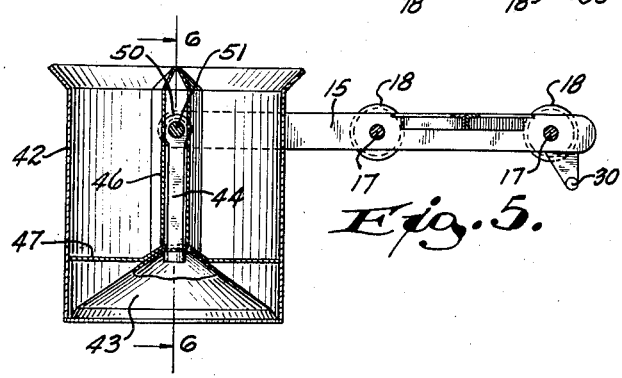
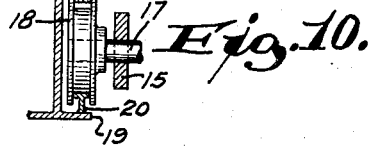
INVENTOR.
Francis T. Kaiser
BY
ATTORNEYS.

United States Patent Office 2,860,791
Patented Nov. 18, 1958

2,860,791
CUPOLA CHARGING APPARATUS UTILIZING A CONE BOTTOM BUCKET

Francis T. Kaiser, Port Washington, Wis., assignor to Modern Equipment Company, Port Washington, Wis., a corporation of Wisconsin Application January 13, 1955, Serial No. 481,635

9 Claims. (Cl. 214—19)

This invention relates to improvements in cupola charging apparatus utilizing a cone bottom bucket.

It is a general object of the present invention to provide cupola charging apparatus having improved means for controlling the movement of the bucket into the cupola and for controlling the lowering of the cone bottom.

A more specific object of the invention is to provide apparatus as above described wherein the bucket has a transverse hollow partition communicating with slots in the sides of the bucket whereby the forward end of the skip carriage may be connected to the cone bottom and may move up and down in the hollow partition and in said slots to control the raising and lowering of the cone bottom.

A further object of the invention is to provide apparatus as above described wherein there is novel means for counterbalancing the outer end of the skip carriage as the cone is being lowered.

Other objects of the invention are to provide cupola charging apparatus which is relatively simple in construction, efficient in operation, and well adapted for the purpose described.

With the above and other objects in view, the invention consists of the improved cupola charging apparatus, and all of its parts and combinations, as set forth in the claims, and all equivalents thereof.

In the accompanying drawings, illustrating one complete embodiment of the preferred form of the invention in which the same reference numerals designate the same parts in all of the views:

Fig. 1 is a fragmentary side elevational view of the improved cupola charging apparatus, part of a cupola being shown in vertical section and the bucket being in charging position;

Fig. 2 is a view showing part of the apparatus of Fig. 1, but showing the bucket before it has advanced to final position in the cupola;

Fig. 3 is a view similar to Fig. 1 showing only a part of the apparatus, the cone, however, being in dropped position;

Fig. 4 is a top view of the skip carriage and bucket, parts of the bucket being broken away;

Fig. 5 is a longitudinal sectional view through the skip carriage and bucket taken on the line 5—5 of Fig. 4;

Fig. 6 is a sectional view taken on the line 6—6 of Fig. 5;

Fig. 7 is a fragmentary detail view in side elevation of the counterweight pick-up hook, parts being broken away and shown in section;

Fig. 8 is a fragmentary detail view principally in side elevation at the lower end of the kick-up cam, parts being broken away and shown in section;

Fig. 9 is a fragmentary vertical sectional view taken through the member 9 of Fig. 3; and Fig. 10 is a transverse sectional view through one of the tracks showing a skip carriage wheel engaged therewith.

Referring more particularly to the drawing, the numeral 10 designates a cupola having a side charging opening 11. The cupola has a region of enlarged interior cross-sectional area with which the charging opening communicates as shown in Figs. 1 and 3, there being a funnel-shaped region between said region of enlarged interior cross-sectional area and the lower portion of the cupola, the latter being of lesser cross-sectional area, as is clear from Figs. 1 and 3. Spaced tracks 12, preferably in the form of I-beams extend from a loading pit at an angle upwardly, as illustrated in Fig. 1, and then have a delivery end which curves toward the opening 11 of the cupola, as at 13. Movable on the tracks 12 is a skip carriage 14 (see Figs. 4 and 5). This may comprise spaced elongated frame members 15 connected by suitable braces 16. Transversely extending axles 17 have flanged wheels 18 rotatably mounted on their ends. The flanges 19 of the I-beams 12 may support upper and lower rails 20, the wheels normally travelling on the lower rails, as shown in Fig. 10.

As shown in Fig. 8, the upper flanges 19 of the I-beams 12, as well as the upper rails 20 are cut away as at 21 to allow the rear wheels 18 to move upwardly from the position of Fig. 2 to the position of Figs. 1 and 8, through the cutouts 21, when the side members 15 of the skip carriage are pivoting on the front wheels of the skip carriage, as shown in Fig. 1. When the rear wheels arrive at the position of Fig. 1 they enter between the lower ends of arcuate kickup cam sections 22 and 22', the latter being mounted between the I-beams 12 and bracing pieces 23.

Suitably mounted on supporting framework 24 is a winch 25 driven by an electric motor 26 through an endless belt drive 27. A cable 28, which has one end connected to the outer or rear end of the skip carriage extends over and around a suitably supported idler sheave 29 and is then windable on the winch 25. Winding up of the cable on the winch 25 causes movement of the skip carriage upwardly on the I-beam tracks 12 to a position just beyond the position of Fig. 2, and then further winding movement causes an upward pull on the rear of the skip carriage to swing the skip carriage frame first to the position of Fig. 1 and finally to the position of Fig. 3.

Beneath the outer end of the skip carriage are suitably supported horizontal pins 30 each of which is adapted to move into the opening of a hook 32 as shown in Figs. 2 and 7 when the skip carriage is moved to the position of Fig. 2 after travelling upwardly on the tracks 12. Each hook is normally supported by a stop 31 midway of its length and has its lower portion projecting through a slot 33' in a flange 33 of a member 34 (see Figs. 2 and 7). The bottom of each hook has the upper end of a cable 35 connected thereto. The cables 35 extend downwardly around idler pulleys 36 and 37, and have lower ends connected to the upper ends of rods 38, the said rods extending slidably through guide blocks 39' for a counterweight 39, and there being a cushioning spring 40 carried by the lower end of each rod 38. The up and down travel of the blocks 39' may be suitably guided in vertical channel members 9.

The charging bucket 42 has an open bottom adapted to be closed by a cone 43, the latter having an upwardly projecting stem 44. The stem projects slidably through a central opening 45 in a hollow transverse partition 46 having a bottom 47. The partition 47 has a closed top as at 48 (Fig. 4), and the sides of the hollow partition are open to communicate with vertical slots 49 in the sides of the bucket. Extending rotatably through an eye 50 at the top of the stem 44 of the cone is a shaft 51 which shaft has its ends projecting through the slots 49 and the sides of the bucket, said shaft being connected to the inner ends of the frame members 15 of the skip carriage and forming a part of said carriage.

Depending from the rim 52 of the bucket are several stop members 53 (see Fig. 3) which are adapted to seat on brackets 54 which project inwardly from the lining of the cupola to support the bucket in charging position, as shown in Fig. 3.

In use of the improved charging apparatus, operation of the electric motor 26 will cause the winch 25 to wind up the cable 28 and pull the skip carriage and bucket up the track 12 to the position of Fig. 2. When the skip carriage arrives at this position the pins 30 will enter the hooks 31. Thereafter, further winding of the cable 28 on the winch 25 will pull the rear wheels 18 over the high spots 22' (see Fig. 8) of the cam kickup members 22 to the position of Fig. 1. During such movement the forward ends of the frame members 15 of the skip carriage travel inwardly and downwardly in an arc to bring the bucket stops 53 into final position on the seats 54, as shown in Fig. 1. During this movement the frame of the skip carriage rocks on the front wheels.

Thereafter, further winding of the cable 28 on the winch 25 will cause additional rocking of the skip carriage frame on the front wheels, with the rear wheels riding up the cam surface of the member 22 from the position of Fig. 1 to the position of Fig. 3. During such movement, the hooks 32 are pulled upwardly as shown in Fig. 3, so that the weight of the counterweight 39 is imposed upon the rear or outer end of the skip carriage and said counterweight 39 is raised upwardly in its guides 9 by the cable 35.

As the rear or outer end of the skip carriage swings upwardly to the position of Fig. 3, the inner or forward end swings downwardly causing the shaft 51, which extends transversely through the bucket, to travel downwardly in the slots 49 and in the hollow partition 46 from the position of Fig. 1 to the position of Fig. 3, thus lowering the cone 43 and dropping the charge into the cupola.

When the cone is in the lowered position shown in Fig. 3, it is surrounded by the cupola portion of enlarged cross-sectional area. Thus the possibility of a descending charge becoming wedged between the cone 43 and the wall of the cupola is minimized.

After the bucket has been emptied the motor 26 may be reversed to cause the winch 25 to play out the cable 28. The counterweight 39 will then return the rear or outer end of the skip carriage from the position of Fig. 3 to the position of Fig. 1 and ultimately to the position of Fig. 2. As additional cable 28 is played out by the winch, the skip carriage will roll down the tracks 12 by gravity, the pins 30 leaving the hooks 32 in the position of Figs. 2 and 7.

From the above it may readily be seen that a very simple and efficient method of controlling the movement of a charging bucket, together with a simple way of causing lowering of the cone has been provided.

Various changes and modifications may be made without departing from the spirit of the invention, and all of such changes are contemplated, as will come within the scope of the claims.

What I claim is:

1. In a cupola charger including a track having a delivery end, a skip carriage movable on said track and having front wheels and having a projection depending from its rear end, a hook releasably supported adjacent said track in a position to be engaged by said projection as the skip carriage arrives at the delivery end of the track, means for causing upward tilting movement of the rear of the skip carriage with said hook on said front wheels after said hook has been engaged, and means including a counterweight connected to said hook for counterbalancing said upward tilting movement of the skip carriage and for subsequently urging said hook and the rear of the skip carriage back to their original positions.

2. In a cupola charger including a track having a delivery end, a skip carriage movable on said track and having a projection, a hook support having a vertical opening therein, a hook having a lower portion movably inserted in said opening so that the upper portion of the hook is in a position to be engaged by the projection of the skip carriage as the carriage arrives at the delivery end of the track, means on the hook preventing further downward movement of the hook through the opening in the hook support, means for causing upward tilting movement of the rear of the skip carriage with said hook after the hook has been engaged, a flexible member connected to the lower portion of said hook below the hook support and depending therebelow, said flexible member being movable in the opening of the hook support upon said tilting movement of the skip carriage, and means including a counterweight connected to said flexible member for counterbalancing said upward tilting movement of the skip carriage and for subsequently urging the rear of the skip carriage back to its original position and returning the hook to its normal position in the hook support.

3. In a cupola charger including a track having a delivery end, a skip carriage movable on said track and having a projection, a hook releasably supported adjacent said track in a position to be engaged by said projection as the skip carriage arrives at the delivery end of the track, means for causing upward tilting movement of the rear of the skip carriage with said hook after said hook has been engaged, a counterweight connected to said hook for counterbalancing said upward tilting movement of the skip carriage and for subsequently urging the hook and rear of the skip carriage back to their original positions, and means including an upright slide for guiding said counterweight in up and down movement.

4. In a cupola charger including a track having a delivery end, a skip carriage movable on said track and having a projection, a hook releasably supported adjacent said track in a position to be engaged by said projection as the skip carriage arrives at the delivery end of the track, means for causing upward tilting movement of the rear of the skip carriage with said hook after said hook has been engaged, a counterweight connected to said hook for counterbalancing said upward tilting movement of the skip carriage and for subsequently urging the hook and rear of the skip carriage back to their original positions, means including an upright slide for guiding said counterweight in up and down movement, and means adjacent said guiding means for cushioning said counterweight.

5. In a cupola charger including a track having a delivery end, a skip carriage movable on said track and having a projection, a hook releasably supported adjacent said track in a position to be engaged by said projection as the skip carriage arrives at the delivery end of the track, means for causing upward tilting movement of the rear of the skip carriage with said hook after said hook has been engaged, a cable connected to said hook and extending therebelow, sheaves supported adjacent said track for guiding the portion of the cable which is below the hook, and a counterweight connected to the lower end of the cable for counterbalancing said upward tilting movement of the skip carriage and for subsequently urging the hook and rear of the skip carriage back to their original positions.

6. In a cupola charger including a track having a delivery end, a skip carriage movable on said track, a charging bucket having a bottom closure provided with an upwardly projecting stem, the sides of said bucket having oppositely disposed vertical slots, a hollow transverse vertical partition in said bucket the sides of which are in communication with said slots, said partition having a bottom opening leading to its hollow interior, and a horizontal bucket supporting shaft at the forward end of the skip carriage extending pivotally through said slots and hollow partition and movable therein in the direction of the slots, said stem of the bottom closure of the bucket extending slidably through the bottom opening of the partition and being suspended from said shaft to be normally held in raised position within said hollow partition with the closure in bottom closing position.

7. In a cupola having a side charging opening with a lower margin, said cupola having a region of enlarged interior cross-sectional area with which said opening communicates at least part of which extends a substantial distance below said lower margin of the charging opening, a charging bucket having a vertically movable cone-bottom closure of substantially less diameter than the interior diameter of said enlarged region of the cupola, means for moving said bucket into the side opening of the cupola and for lowering the cone to a discharge position where it is intermediate the height of and surrounded by said region of enlarged interior cross-sectional area of the cupola with said enlarged area extending a substantial distance below the discharge position of said cone to minimize the possibility of a descending charge becoming wedged between the cone and the wall of the cupola, the cupola having a region below said enlarged area which is of less interior cross-sectional area, and the interior of the cupola having a funnel-shaped region between said region of enlarged interior cross-section and said region of lesser cross-sectional area and located a substantial distance below the cone when the latter is in discharge position.

8. In a cupola having a side charging opening with a lower margin, said cupola having a region of enlarged interior cross-sectional area with which said opening communicates at least part of which extends a substantial distance below said lower margin of the charging opening, a charging bucket having a vertically movable cone-bottom closure of substantially less diameter than the interior diameter of said enlarged region of the cupola, means for moving said bucket into the side opening of the cupola and for lowering the cone to a discharge position where it is intermediate the height of and surrounded by said region of enlarged interior cross-sectional area of the cupola with said enlarged area extending a substantial distance below the discharge position of said cone to minimize the possibility of a descending charge becoming wedged between the cone and the wall of the cupola, the cupola having a region below said enlarged area which is of less interior cross-sectional area, and the interior of the cupola having a funnel-shaped region between said region of enlarged interior cross-section and said region of lesser cross-sectional area and located a substantial distance below the cone when the latter is in discharge position, the cross-sectional dimensions of the interior of said enlarged area being greater than the corresponding cross-sectional dimensions of the exterior of said region of lesser cross-sectional area.

9. In a cupola charger including a track having a delivery end, a skip carriage movable on said track, a charging bucket having a bottom closure, the sides of said bucket having oppositely disposed vertical slots, a hollow transverse vertical partition in said bucket the sides of which are in communication with said slots, said partition having a bottom opening leading to its hollow interior, and a horizontal bucket supporting shaft at the forward end of the skip carriage extending pivotally through said slots and hollow partition and movable therein in the direction of the slots, and means depending from said shaft through the bottom opening in the partition and connected to said bottom closure, said connecting means being normally held in raised position within said hollow partition with the closure in bottom closing position.

References Cited in the file of this patent

UNITED STATES PATENTS

| | | |
|---|---|---|
| 2,200,652 | Richardson | May 14, 1940 |
| 2,712,468 | Fones | July 5, 1955 |
| 2,719,635 | Gilchrist | Oct. 4, 1955 |

FOREIGN PATENTS

| | | |
|---|---|---|
| 26,873 | Austria | Dec. 27, 1906 |
| 236,198 | Germany | July 1, 1911 |
| 236,774 | Germany | Sept. 10, 1913 |